United States Patent [19]

Kanzler

[11] 3,942,379

[45] Mar. 9, 1976

[54] FLOATING WAVE STILLING CHAMBER FOR LIQUID LEVEL INDICATOR

[75] Inventor: Alfred Avery Kanzler, Downers Grove, Ill.

[73] Assignee: Chicago Bridge & Iron Company, Oak Brook, Ill.

[22] Filed: Jan. 17, 1975

[21] Appl. No.: 541,785

[52] U.S. Cl. .................. 73/311; 33/126.5; 73/321; 137/582
[51] Int. Cl.² ......................................... G01F 23/08
[58] Field of Search ............ 73/311, 321, 318, 305, 73/291; 33/126.5, 126.6; 137/423, 582

[56] References Cited
UNITED STATES PATENTS

| 981,434 | 8/1975 | Lander | 33/126.5 X |
|---|---|---|---|
| 2,678,060 | 5/1954 | Arne | 73/291 X |
| 3,217,541 | 11/1965 | Williamson | 73/321 |
| 3,498,141 | 3/1970 | Nelson et al. | 73/322.5 X |

FOREIGN PATENTS OR APPLICATIONS

| 504,798 | 4/1920 | France | 73/311 |
|---|---|---|---|
| 702,984 | 4/1931 | France | 73/311 |

*Primary Examiner*—Richard C. Queisser
*Assistant Examiner*—Daniel M. Yasich
*Attorney, Agent, or Firm*—Merriam, Marshall, Shapiro & Klose

[57] ABSTRACT

A gage mechanism for determining the level of a liquid, comprising a measuring means joined to a liquid level indicating device, a floating stilling chamber circumscribing the periphery of the liquid level indicating device, said stilling chamber having walls extending above wave action of the liquid, and vertical guide means for controlling lateral movement of the chamber at all levels at which the liquid level is to be measured.

16 Claims, 3 Drawing Figures

U.S. Patent    March 9, 1976    3,942,379
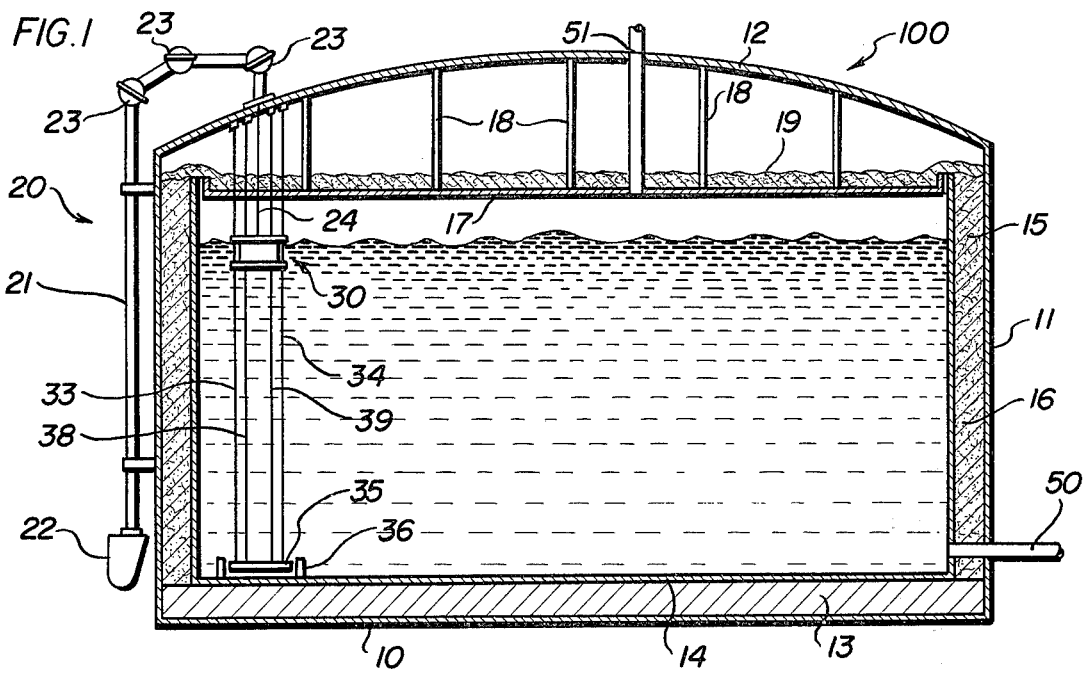
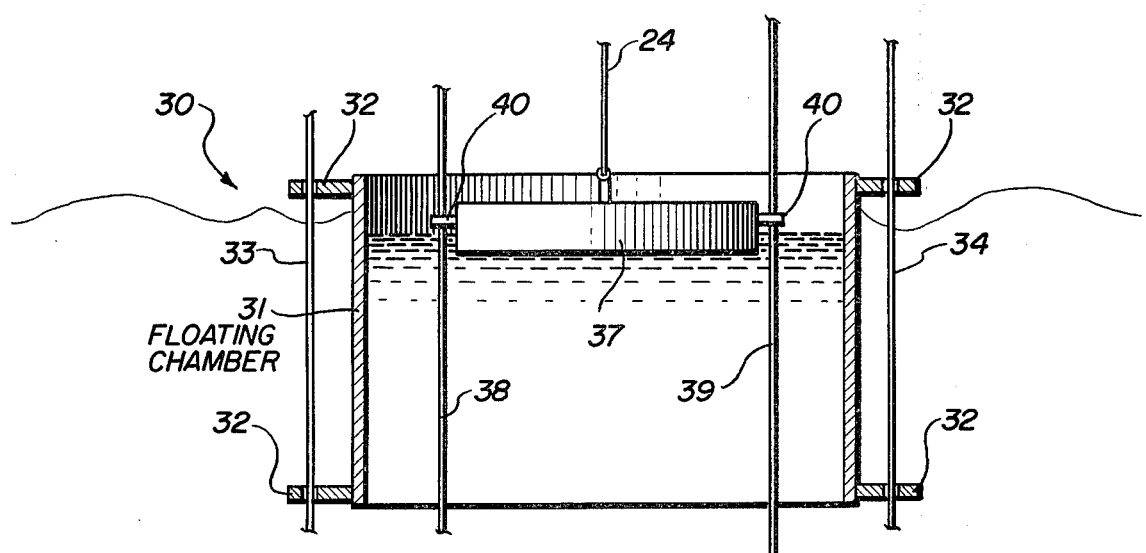
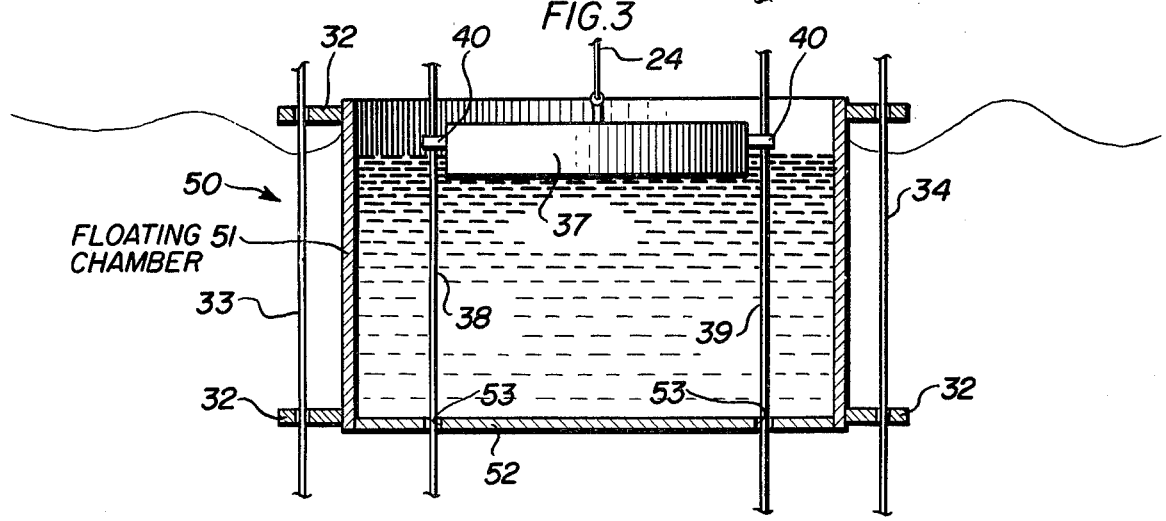

FLOATING WAVE STILLING CHAMBER FOR LIQUID LEVEL INDICATOR

This invention relates to liquid level measuring devices. More particularly, this invention is concerned with an improvement in liquid level measuring devices which suppresses the effect of wave action on the measuring of a liquid level.

There are many instances where it is important that the level of a liquid be known with relatively good accuracy. Thus, the level of lakes, rivers and reservoirs must often by known so that various water control programs can be operated effectively, such as for flood control, irrigation and hydro-electric power generation. It is also important to know the water level in water storage towers as well as the liquid level in tanks used for storing oil and other organic liquids such as gasoline, kerosene, alcohol and the like. Turbulent liquids, or liquids with low boiling temperatures, such as liquefied natural gas, cause particular gauging problems because of their unsteady surface.

One way in which the liquid level is presently determined is by use of a float on the liquid. The float is connected to a measuring wire or tape which is then fed to a suitable gage head where the height of the liquid level can be read off directly by observing markings on the tape or wire. Such a measuring system provides accurate readings for a liquid level only when the liquid level is free of waves. This is true even in those instances where vertical movement of the float is guided by wires or rods which extend upright into and above the liquid level to thus prevent the float from being displaced laterally by wave or wind action.

Other devices are sometimes used in place of a float to determine the location of the liquid level. Some of these devices are temperature sensors, thermal and electrical conductivity devices, and liquid displacers. All such devices, however, require elimination of wave action against the device to obtain an accurate indication of the liquid level.

To prevent wave action from interfering with a liquid level indicating device, it has been common to put the device in a large diameter vertical pipe which communicates with the liquid and which extends from an anticipated low liquid level to a high liquid level. The pipe provides a stilling chamber containing the liquid in which the liquid level indicating device is essentially unaffected by wave action. While such a system performs satisfactorily it is often expensive since the pipes sometimes must be 100 feet or more long and must at times be made of costly metal alloys. There is thus a need for simple, less expensive means for protecting a liquid level indicating device from wave action so that accurate measuring can be achieved.

According to the present invention, there is provided a gage mechanism for measuring liquid level comprising a measuring means joined to a liquid level indicating device, a floating stilling chamber circumscribing the periphery of the liquid level indicating device, said stilling chamber having walls extending above wave action of the liquid level, and vertical guide means for controlling lateral movement of the floating stilling chamber at all liquid levels at which it is to be used. For most suitable results the stilling chamber walls project about one wave height or more below a steady liquid level to thereby prevent wave action from affecting the liquid level indicating device.

The vertical guide means advisably comprises at least two equally spaced-apart wires which extend for a height at least equal to the maximum and minimum liquid levels to be measured. The floating stilling chamber is vertically slidable on the wires. It is, in addition, desirable that another spaced-apart set of wires be positioned within the floating stilling chamber and that the liquid level indicating device to be vertically slidable thereon and be guided thereby to center it within the chamber.

The floating stilling chamber can be open at the top and the bottom and be in the shape of a vertically positioned shell. The shell can be circular in horizontal cross-section or any other suitable shape. However, the chamber can have a bottom wall, provided there is an opening to the inside of the chamber which permits the same liquid level inside as well as outside of the chamber.

The invention will be described further in conjunction with the attached drawings, in which:

FIG. 1 is a vertical sectional view through a storage tank for a liquid, such as oil or a liquefied gas having a liquid level gage mechanism;

FIG. 2 is a partial vertical sectional view showing the gage mechanism with a float as the liquid level indicating device, and the floating stilling chamber used in the tank of FIG. 1; and FIG. 3 is a view like FIG. 2 but with the stilling chamber having a bottom wall.

So far as is practical, the same parts or elements which appear in the different views of the drawings will be identified by the same numbers.

The tank 100 shown in FIG. 1 has a metal outer bottom 10 and an outer vertical cylindrical circular wall 11 on which domed roof 12 is supported. Load bearing insulation 13 is placed on the inner surface of outer bottom 10. Inner tank bottom 14 is supported by insulation 13. Inner tank shell 15 is joined at its lower edge to the peripheral edge of inner bottom 14. Insulation 16 is positioned between the outer wall 11 and the inner wall 15.

Metal deck 17 is suspended by rods 18 from domed roof 12. Insulation 19 is placed on the deck 17 to insulate the storage space beneath the deck so that the tank can be used for storing a liquefied gas at a low temperature, such as liquefied natural gas at −260°F. and 15 psia. Pipe 50 is used to feed liquid to the tank and to remove it therefrom. Pipe 51 communicates with the tank liquid storage space and is used to remove vapor therefrom or to add a gas during tank emptying.

The gage mechanism 20 mounted on the tank 100 shown in FIG. 1 has a guide pipe 21 which communicates at its bottom end with gage head 22 and at its top end with an opening in the domed tank roof 12. Knuckles 23 in pipe 21 contain pulleys (not shown) on which measuring tape 24 rides. The measuring tape 24 is joined at its lower end to a reel mechanism (not shown) mounted in gage head 22. The liquid level in the tank 100 is read by observing a measurement or marking on the measuring tape through the gage head 22.

As shown in FIGS. 1 and 2, floating stilling chamber 30 has a vertical cylindrical circular wall 31. The wall 31 can be made of a material less dense than the liquid, or it can be made of a more dense material and a buoyancy chamber or float attached to it. Laterally projecting tabs 32 are provided with holes to receive the guide wires 33 and 34. The guide wires 33 and 34 are attached at their upper ends to the inside surface of domed roof 12. The bottom ends of guide wires 33 and 34 are attached to weight 35 which hangs just above the inner tank bottom 14. Lateral motion of the weight 35 is prevented by restraining flanges 36 which extend upwardly from the inner tank bottom 14. In this way expansion and contraction with changes in temperature of the guide wires 33 and 34 can be accommodated without over-stressing the wires and causing them to break.

Float 37 is attached to measuring tape 24. Float guide wires 38 and 39 pass through holes in tabs 40 on float 37. The guide wires 38 and 39 are attached at their upper ends to the inner surface of domed roof 12 and at their lower ends to weight 35. In this way lateral movement of float 37 is prevented, and the float 37 is maintained centered in floating stilling chamber 30.

As shown in FIG. 2 the floating stilling chamber guide wires 33 and 34 are parallel to one another and the float guide wires 38 and 39 are parallel to each other and to the chamber guide wires.

The floating stilling chamber 30 is advisably made of a height and to float so that its top extends above the liquid level higher than any expected waves. Furthermore, the chamber cylinder is made of such a length that it extends below the liquid level surface a distance equal to at least one wave height. The floating stilling chamber as provided and illustrated prevents wave action from affecting the float 37 within the floating stilling chamber 30. The floating stilling chamber is independent of the float and can float up and down with liquid level change without wave action interfering with accurate liquid level measurements at any time. The guide wires 33 and 34 prevent the floating stilling chamber from rocking action due to waves and horizontal displacement or any other motion which might generate waves on the liquid surface within the stilling chamber.

With reference to FIG. 3, the floating stilling chamber 50 has a vertical cylindrical circular wall 51 which is joined to a bottom wall 52. The bottom wall 52 has holes 53 through which the float guide wires 38 and 39 are threaded. The holes 53 are made large enough so that liquid can flow in and out of the floating stilling chamber 50 to maintain the same liquid level inside as well as outside of the chamber.

Although the gage mechanism device with the floating stilling chamber has been illustrated with respect to use in a tank, the same mechanism can be used for measuring the liquid level of open bodies of liquid, such as lakes, rivers, reservoirs and oceans.

It should also be understood that any other liquid level indicating device besides a float can be used in practicing the invention. Such other devices will also give accurate liquid level readings when positioned in the stilling chamber where wave action is avoided.

The foregoing detailed description has been given for clearness of understanding only, and no unnecessary limitations should be understood therefrom, as modifications will be obvious to those skilled in the art.

What is claimed is:

1. A gage mechanism for determining the level of a liquid, comprising:
   a measuring means joined to a liquid level indicating device;
   a floating wave stilling chamber circumscribing the periphery of the liquid level indicating device, said stilling chamber having walls extending above wave action of the liquid, said floating stilling chamber having at least one opening in the top and in the bottom; and
   vertical guide means for controlling lateral movement of the chamber at all levels at which the liquid level is to be measured.

2. A gage mechanism according to claim 1 in which the stilling chamber walls project at least one wave height below the liquid level.

3. A gage mechanism for determining the level of a liquid, comprising:
   a measuring means joined to a gage float which floats on liquid;
   a floating wave stilling chamber circumscribing the periphery of the gage float, said stilling chamber having walls extending above wave action of the liquid, said floating stilling chamber having at least one opening in the top and in the bottom; and
   vertical guide means for controlling lateral movement of the chamber at all levels at which the liquid is to be measured.

4. A gage mechanism according to claim 3 in which the stilling chamber walls project at least one wave height below the liquid level.

5. A gage mechanism according to claim 3 in which the vertical guide means includes at least two equally spaced-apart guides which extend for at least the height of the liquid to be measured and the chamber is vertically slidable thereon.

6. A gage mechanism according to claim 5 in which at least two equally spaced-apart guides are positioned within the chamber and the float is vertically slidable thereon and is guided thereby to center it within the chamber.

7. A gage mechanism according to claim 3 in which the chamber is substantially completely open at the top and bottom.

8. A gage mechanism according to claim 3 in which the chamber has a bottom wall and the opening in the chamber permits the same liquid level inside and outside of the chamber.

9. A tank having a gage mechanism for determining the liquid level in the tank;
   said gage mechanism comprising a measuring means joined to a liquid level indicating device;
   a floating wave stilling chamber circumscribing the periphery of the liquid level indicating device, said stilling chamber having walls extending above wave action of liquid in the tank, said floating stilling chamber having at least one opening in the top and in the bottom, and
   vertical guide means in the tank for controlling lateral movement of the chamber in the tank at all liquid levels in the tank.

10. A tank according to claim 9 in which the stilling chamber walls project at least one wave height below the liquid level.

11. A tank having a gage mechanism for determining the liquid level in the tank;
   said gage mechanism comprising a measuring tape joined to a gage float which floats on liquid in the tank;
   a floating stilling chamber circumscribing the periphery of the gage float, said stilling chamber having walls extending above wave action of liquid in the tank, said floating stilling chamber having at least one opening in the top and in the bottom, and
   vertical guide means in the tank for controlling lateral movement of the chamber in the tank at all liquid levels in the tank.

12. A tank according to claim 11 in which the stilling chamber walls project at least one wave height below the liquid level.

13. A tank according to claim 11 in which the vertical guide means includes at least two equally spaced-apart guides which extend for at least the liquid storage depth of the tank and the chamber is vertically slidable thereon.

14. A tank according to claim 13 in which at least two equally spaced-apart guides are positioned within the chamber and the float is vertically slidable thereon and is guided thereby to center it within the chamber.

15. A tank according to claim 11 in which the chamber is substantially completely open at the top and bottom.

16. A tank according to claim 11 in which the chamber has a bottom wall and the opening in the chamber permits the same liquid level inside and outside of the chamber.

* * * * *

UNITED STATES PATENT AND TRADEMARK OFFICE
CERTIFICATE OF CORRECTION

PATENT NO. : 3,942,379
DATED : March 9, 1976
INVENTOR(S) : Alfred Avery Kanzler

It is certified that error appears in the above-identified patent and that said Letters Patent are hereby corrected as shown below:

Column 1, line 13, change "by" to --be--;
column 4, line 62, after "floating" insert --wave--.

Signed and Sealed this eighteenth Day of May 1976

[SEAL]

Attest:

RUTH C. MASON
Attesting Officer

C. MARSHALL DANN
Commissioner of Patents and Trademarks